United States Patent Office 2,909,555
Patented Oct. 20, 1959

2,909,555

OXIDATION OF ALKYL PHOSPHITES

Carleton B. Scott, Pomona, Calif., assignor, by mesne assignments, to Collier Carbon and Chemical Corporation, a corporation of California No Drawing. Application July 25, 1955
Serial No. 524,275

7 Claims. (Cl. 260—461)

This invention relates to the oxidation of alkyl phosphites, and in particular concerns the oxidation of such phosphites to the corresponding phosphates by means of a novel oxidizing agent.

It is known that primary trialkyl phosphites of the general formula:

$$(R-CH_2-O-)_3P$$

wherein R represents hydrogen or an alkyl or substituted alkyl group, can be oxidized to the corresponding phosphates. Because of the ease of hydrolysis of the phosphite starting materials, "wet" oxidation methods are generally unsatisfactory and it is preferred to employ as the oxidizing agent a material which will yield nascent oxygen in the absence of water, e.g., sulfur trioxide and mixtures of the same with air. Such oxidizing agents, however, are relatively strong and in many instances it is difficult to control their activity to avoid over-oxidation and decomposition. This is particularly true where the alkyl groups of the trialkyl phosphite are unsaturated or contain tertiary carbon-hydrogen bonds or contain substituent groups which are sensitive to oxidation, e.g., aldehyde or ketone groups.

I have now found that olefine oxides of the general formula:

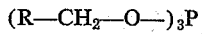

wherein R' represents hydrogen, alkyl or aryl, are excellent oxidizing agents for the aforesaid trialkyl phosphites since they exert only a very mild oxidizing action thereon and oxidation is confined to the phosphite group. Accordingly, the reaction is very readily controlled to avoid decomposition, particularly when the phosphite contains other configurations which are sensitive to oxidation. The invention thus consists in the process of reacting a trialkyl phosphite of the aforesaid general formula with the olefine oxide under conditions hereinafter set forth to obtain the corresponding trialkyl phosphate. The olefine oxide is simultaneously reduced to form the corresponding free olefine as a by-product.

The over-all reaction which the process of the invention effects may be described by the equation:

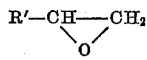

$$(R-CH_2-O-)_3PO + R'-CH=CH$$

wherein R and R' have the meanings previously stated. As examples of the trialkyl phosphites which undergo oxidation in accordance with the above equation, there may be mentioned trimethyl phosphite, triethyl phosphite, tri-n-propyl phosphite, tri-n-butyl phosphite, tri-(2,2-dimethylethyl)-phosphite, tri-n octyl phosphite, tri-(2-chloroethyl)-phosphite, tri-(2-tert. butylethyl)-phosphite, tri-n-dodecyl phosphite, tri-(2-mercapto-ethyl)-phosphite, tri-(2-formylethyl) phosphite, etc. Suitable olefine oxide oxidizing agents include ethylene oxide, methylethylene oxide, isopropyl-ethylene oxide, styrene oxide, etc.

In general, the reaction is effected at a temperature between about 50° and about 200° C., although the optimum conditions will depend upon the nature of the phosphite reactant. Thus, when the alkyl groups of the phosphite are free from easily oxidized linkages, temperatures in the upper portion of the range may be employed in the interests of decreasing the reaction time. On the other hand, should such alkyl groups contain oxidizable linkages, the use of milder reaction conditions and longer reaction times is indicated. When, as in most instances, the olefine reactant boils below the reaction temperature, the reaction is carried out in a closed vessel under autogenic pressure. Accordingly, the progress of the reaction can be followed and its completion readily determined simply by observing the pressure developed within the reaction vessel. Atmospheric pressure may be employed when both reactants are non-volatile. In general, the time required for completion of the reaction will be between 2 and about 24 hours depending upon the reaction temperature employed. The reactants are usually employed in equimolecular proportions, although an excess of the olefine oxide may be provided to insure complete oxidation of the phosphite. If desired, the reactants may be initially dissolved in an inert solvent, e.g., benzene, toluene, etc. Upon completion of the reaction, the reaction vessel and contents are cooled and the vessel is vented through a conventional system for recovering the free olefine which constitutes a valuable by-product. The phosphate product is then purified in the usual manner, e.g., by fractional distillation, crystallization, or stripping with the vapor of an inert liquid.

The following examples will illustrate several applications of the principle of the invention, but are not to be construed as limiting the same.

*Example 1*

An equimolecular mixture of triethyl phosphite and ethylene oxide is charged to a rocking autoclave and is gradually heated to a temperature of about 170° C. At about 150° C. the pressure within the autoclave begins to increase and rises to a value of about 500 p.s.i.g. over a period of 2 hours. Heating is continued for about 8 hours, after which the autoclave and contents are cooled to room temperature and vented through a Dry Ice trap to recover volatile products. The latter consist essentially of ethylene and traces of unreacted ethylene oxide. The non-volatile product is fractionally distilled and found to consist of triethyl phosphate and a small quantity of unreacted triethyl phosphite.

*Example 2*

An equimolecular mixture of triethyl phosphite and propylene oxide is heated in a closed reactor at about 150° C. for about 23 hours under an autogenic pressure of about 350 p.s.i.g. The reactor and contents are then cooled and the reactor is vented through a low temperature trap to recover essentially pure propylene as a by-product. Vacuum distillation of the liquid residue remaining in the autoclave shows it to consist of triethyl phosphate containing small amounts of unreacted triethyl phosphite and propylene oxide.

*Example 3*

An equimolecular mixture of triethyl phosphite and styrene oxide is heated in an open reaction vessel at about 150° C. for 15 hours. Vacuum distillation of the reaction product yields triethyl phosphate, polystyrene and small amounts of unreacted triethyl phosphite and styrene oxide.

*Example 4*

A mixture consisting of about 1 mole of triallyl phosphite and 1.2 moles of ethylene oxide is heated at 95°–150° C. under autogenic pressure for 5 hours. The liquid portion of the reaction product consists essentially of triallyl phosphate and a small amount of unreacted triallyl phosphite. Substantially no oxidation at the double bond occurs.

While the process of the invention has been herein described with particular reference to the preparation of trialkyl phosphates, it will be apparent that in some instances the free olefine may constitute the more highly desired product, i.e., the process may be considered as one involving the reduction of an olefine oxide to obtain the corresponding free olefine and, as a by-product, a trialkyl phosphate.

Other modes of applying the principle of my invention may be employed instead of those explained, change being made as regards the methods or materials employed provided the step or steps stated by any of the following claims, or the equivalent of such stated step or steps, be employed.

I, therefore particularly point out and distinctly claim as my invention:

1. The process for preparing olefines and tri-esters of phosphoric acid which comprises reacting a tri-ester of phosphorous acid having the general formula:

$$(R-CH_2-O)_3P$$

wherein R represents a substituent selected from the class consisting of hydrogen, alkyl and alkenyl radicals containing from 1 to 12 carbon atoms, alkyl radicals containing from 1 to 12 carbon atoms and bearing an aldehydic substituent, and alkyl radicals containing from 1 to 12 carbon atoms and bearing a ketonic substituent, with an olefine oxide of the general formula:

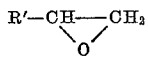

wherein R' represents a substituent selected from the class consisting of hydrogen, the phenyl radical, and alkyl groups containing from 1 to 3 carbon atoms, at a temperature between about 50° C. and about 200° C. and under autogenic pressure, said reaction effecting the formation of a tri-ester of phosphoric acid having the general formula $(R-CH_2-O)_3PO$ and an olefine of the formula $R'-CH=CH_2$.

2. A process according to claim 1 wherein the olefine oxide is ethylene oxide.

3. A process according to claim 1 wherein the olefine oxide is propylene oxide.

4. A process according to claim 1 wherein the olefine oxide is styrene oxide.

5. A process according to claim 1 wherein R represents an alkyl group containing an oxidizable substituent selected from the class consisting of aldehydic and ketonic substituents.

6. A process according to claim 1 wherein R represents an alkenyl group.

7. A process according to claim 1 wherein R represents an alkyl group containing a tertiary carbon atom.

References Cited in the file of this patent

UNITED STATES PATENTS 2,372,244     Adams et al. _____ Mar. 27, 1945

OTHER REFERENCES

Kosolapoff: Organophosphorus Compounds, John Wiley and Sons, New York, 1950, p. 231.

Chem. Abstracts, vol. 47, 1953, 10464(b).